United States Patent Office 2,808,312
Patented Oct. 1, 1957

2,808,312

PROCESS FOR TREATING VOLATILE METAL FLUORIDES

Alfred J. Rudge, Frodsham, and Arnold J. Lowe, Atherton, England, assignors to Imperial Chemical Industries Limited, a corporation of Great Britain No Drawing. Application December 17, 1943, Serial No. 514,714. In Great Britain August 20, 1941

Section 1, Public Law 690, August 8, 1946
Patent expires August 20, 1961

19 Claims. (Cl. 23—14.5)

This invention relates to improvements in the purification of fluorides, and more particularly to the purification of volatile metal fluorides.

Various methods of preparing metal fluorides are known, including the treatment of metals or compounds thereof with hydrofluoric acid, or with elementary fluorine. The fluorides so obtained are frequently contaminated with small amounts of hydrofluoric acid, and in the case of volatile metal fluorides this is not easy to remove; thus uranium hexafluoride made by reacting the metal or its tetrafluoride with fluorine frequently contains traces of hydrofluoric acid. It has been stated that the fluoride may be purified by simple distillation or by distillation over phosphorus pentoxide, but neither of these methods is entirely satisfactory. The first because complete separation is not achieved, and the second because reaction between the pentoxide and the hydrofluoric acid may give rise to phosphorus oxyfluoride which is itself volatile, and may distil with the metal fluoride. In any event the phosphorus pentoxide is inconvenient in use because of its extremely hygroscopic nature, and moreover is comparatively slow in its reaction with the traces of hydrofluoric acid.

According to the present invention, a volatile metal fluoride containing as an impurity a small amount of hydrofluoric acid is treated to remove such impurity by contacting the volatile metal fluoride with an anhydrous alkali metal fluoride, and then removing the volatile metal fluoride. Preferably the volatile metal fluoride is removed by distillation. By a volatile metal fluoride we mean one which is not normally gaseous, and which boils or sublimes below 120° C. at ordinary pressure.

By contacting the volatile metal fluoride with the anhydrous alkali metal fluoride in this way a non-volatile complex containing hydrofluoric acid and the alkali metal fluoride is formed. This complex may be a double compound of the type MF.HF (M being the alkali metal), or possibly in some cases a triple compound including also a proportion of the voltaile metal fluoride being treated. Sufficient of the alkali metal fluoride should be used to combine with all the hydrofluoric acid, and in many cases it is advantageous to employ a considerable excess. This is particularly the case when the volatile metal fluoride is a solid, since intimate contact between the two fluorides is more easily promoted and the fixation of the hydrofluoric acid thus facilitated.

If sodium fluoride is to be employed, which is normally anhydrous, it is advantageous to break it up or grind it into small pieces before use, but otherwise no preparatory treatment is needed. In the case of a hydrated fluoride, e. g. potassium fluoride, the hydrated salt is first dehydrated, suitably by heating it, e. g. at 200° C. for 24 hours, and then breaking it up and, optionally, sieving it to remove the dust. Alternatively, the anhydrous powder may be sintered, or it may be compressed lightly in a pelleting machine to yield porous pellets. The anhydrous alkali metal fluoride, prepared by heating and treating it in this way to give it a large surface area, appears to be particularly suitable for use in our invention.

The process may be carried out in conjunction with the final stages of preparation of the volatile metal fluoride by distilling or subliming it from the reaction vessel in which it is prepared into a receiver containing a suitable amount of the alkali metal fluoride, and then after leaving the two fluorides in contact for a time, redistilling or subliming the volatile metal fluoride into a second receiver. Alternatively, the vapours of the fluoride may be passed over or through a bed of the alkali metal fluoride; where the volatile metal fluoride is normally liquid, or can be brought to a liquid state by heating at ordinary or elevated pressures, the liquid may be filtered through a column of the purifying agent.

In any of these forms of our invention the alkali metal fluoride used in the process may be regenerated by heating strongly to decompose the complex compound formed with the hydrogen fluoride, and may then be used to purify further quantities of the volatile metal fluoride.

The following examples illustrate but do not limit our invention, all parts being by weight. The potassium fluoride for use in these examples was made by heating the hydrate $KF,2H_2O$ at 200° C. for 24 hours, breaking up the sintered mass into pieces of about 2–5 mm., and sieving off the dust.

*Example I*

2.5 parts of uranium hexafluoride containing approximately 0.5% of hydrofluoric acid were distilled in vacuo into a receiver containing 5.4 parts of anhydrous potassium fluoride in the form of small pieces of about 5 mm. diameter, and left in contact with it for 12 hours. The uranium hexafluoride was then distilled off again in vacuo into a second receiver and was found to be substantially free of hydrofluoric acid; it showed no sign of attack or deposit on glass when transferred to a glass vessel. Substantially the whole of the uranium fluoride was recovered.

*Example II*

1 part of uranium hexafluoride was distilled in vacuo, the vapours being caused to pass over fragments of anhydrous potassium fluoride weighing about 4 parts packed into a long narrow column. The distilled material was substantially free of hydrofluoric acid and without action on glass.

*Example III*

11 parts of uranium hexafluoride contaminated with a small amount of hydrofluoric acid were mixed with 1 part of crushed anhydrous potassium fluoride in a mild steel vessel. The vessel was closed, immersed in a water bath at 80° C. to melt the uranium hexafluoride, and kept in the bath for 3 hours with occasional agitation. The vessel was then removed and connected to a vacuum distillation line so that the uranium hexafluoride could be distilled off, and the distillation was then carried out. 97% of the uranium hexafluoride was thus recovered as clear white crystals which did not attack dry glass.

*Example IV*

An apparatus was set up in which two vessels, each adapted to act either as a still or as a distillate receiver, were in communication through a wide tube. The system could be evacuated. Uranium hexafluoride containing a small amount of hydrofluoric acid was charged into one of the vessels, and anhydrous sintered potassium fluoride weighing about 10 times the weight of the hexafluoride was placed in the wide tube. The apparatus was then evacuated and the hexafluoride distilled 6 times from one vessel to the other. The vapour of the hexafluoride was thus caused to pass 6 times through the bed of potassium fluoride. After the last distillation the hexafluoride was obtained as glistening transparent crystals which were without action on dry glass.

Although the invention has been described with special reference to the purification of uranium hexafluoride, the invention is not limited thereto but may be applied to the purification of other hexafluorides which are not normally gaseous but which do boil or sublime below 120° C. at ordinary pressures. Examples of such fluorides are molybdenum hexafluoride, tungsten hexafluoride and tellurium hexafluoride.

We claim:

1. A process for treating a volatile metal fluoride which is not normally gaseous and which vaporizes below 120° C. at ordinary pressure containing as impurity a small amount of hydrofluoric acid which comprises contacting the volatile metal fluoride with an anhydrous alkali metal fluoride and subsequently removing the volatile metal fluoride from contact with the alkali metal fluoride by vaporization and condensing the vaporized volatile metal fluoride.

2. A process for treating a volatile metal fluoride which is not normally gaseous and which vaporizes below 120° C. at ordinary pressure containing as impurity a small amount of hydrofluoric acid which comprises contacting the volatile metal fluoride with an anhydrous alkali metal fluoride, subsequently vaporising the volatile metal fluoride and thereby separating it from the alkali metal fluoride, and condensing the vapours of the volatile metal fluoride.

3. A process for treating a volatile metal fluoride which is not normally gaseous and which vaporizes below 120° C. at ordinary pressure containing as impurity a small amount of hydrofluoric acid which comprises contacting the volatile metal fluoride with an anhydrous alkali metal fluoride by forming an intimate mixture of the said fluorides, subsequently heating the said mixture so as to vaporise the volatile metal fluoride and thereby separate it from the alkali metal fluoride, and condensing the vapours of the volatile metal fluoride.

4. A process for treating a volatile metal fluoride which is not normally gaseous and which vaporizes below 120° C. at ordinary pressure containing as impurity a small amount of hydrofluoric acid which comprises contacting the volatile metal fluoride with anhydrous potassium fluoride and subsequently removing the volatile metal fluoride from contact with the anhydrous potassium fluoride.

5. A process for treating a volatile metal fluoride which is not normally gaseous and which vaporizes below 120° C. at ordinary pressure containing as impurity a small amount of hydrofluoric acid which comprises contacting the volatile metal fluoride with anhydrous potassium fluoride, subsequently vaporising the volatile metal fluoride and thereby separating it from the anhydrous potassium fluoride, and condensing the vapours of the volatile metal fluoride.

6. A process for treating a volatile metal fluoride which is not normally gaseous and which vaporizes below 120° C. at ordinary pressure containing as impurity a small amount of hydrofluoric acid which comprises contacting the volatile metal fluoride with anhydrous potassium fluoride by forming an intimate mixture of the said fluorides, subsequently heating the said mixture so as to vaporise the volatile metal fluoride and thereby separate it from the anhydrous potassium fluoride, and condensing the vapours of the volatile metal fluoride.

7. A process for treating a volatile metal fluoride which is not normally gaseous and which vaporizes below 120° C. at ordinary pressure containing as impurity a small amount of hydrofluoric acid which comprises heating hydrated potassium fluoride to render it anhydrous, forming an intimate mixture of the said anhydrous fluoride with the said volatile metal fluoride, subsequently vaporising the volatile metal fluoride and thereby separating it from the potassium fluoride, and condensing the vapours of the volatile metal fluoride.

8. A process for treating a volatile metal fluoride which is not normally gaseous and which vaporizes below 120° C. at ordinary pressure containing as impurity a small amount of hydrofluoric acid which comprises heating hydrated potassium fluoride to render it anhydrous, forming an intimate mixture of the said anhydrous fluoride with the said volatile metal fluoride, subsequently heating the said mixture so as to vaporise the volatile metal fluoride and thereby separate it from the potassium fluoride, and condensing the vapours of the volatile metal fluoride.

9. A process for treating uranium hexafluoride containing as imprity a small amount of hydrofluoric acid which comprises contacting the uranium hexafluoride with an anhydrous alkali metal fluoride and subsequently removing the uranium hexafluoride from contact with the alkali metal fluoride.

10. A process for treating uranium hexafluoride containing as impurity a small amount of hydrofluoric acid which comprises contacting the uranium hexafluoride with an anhydrous alkali metal fluoride, subsequently vaporising the uranium hexafluoride and thereby separating it from the alkali metal fluoride, and condensing the vapours of the uranium hexafluoride.

11. A process for treating uranium hexafluoride containing as impurity a small amount of hydrofluoric acid which comprises contacting the uranium hexafluoride with an anhydrous alkali metal fluoride by forming an intimate mixture of the said fluorides, subsequently heating the said mixture so as to vaporise the uranium hexafluoride and thereby separate it from the alkali metal fluoride, and condensing the vapours of the uranium hexafluoride.

12. A process for treating uranium hexafluoride containing as impurity a small amount of hydrofluoric acid which comprises contacting the uranium hexafluoride with anhydrous potassium fluoride and subsequently removing the uranium hexafluoride from contact with the anhydrous potassium fluoride.

13. A process for treating uranium hexafluoride containing as impurity a small amount of hydrofluoric acid which comprises contacting the uranium hexafluoride with anhydrous potassium fluoride, subsequently vaporising the uranium hexafluoride and thereby separating it from the anhydrous potassium fluoride, and condensing the vapours of the uranium hexafluoride.

14. A process for treating uranium hexafluoride containing as impurity a small amount of hydrofluoric acid which comprises contacting the uranium hexafluoride with anhydrous potassium fluoride by forming an intimate mixture of the said fluorides, subsequently heating the said mixture so as to vaporise the uranium hexafluoride and thereby separate it from the anhydrous potassium fluoride, and condensing the vapours of the uranium hexafluoride.

15. A process for treating uranium hexafluoride containing as impurity a small amount of hydrofluoric acid which comprises heating hydrated potassium fluoride to render it anhydrous, forming an intimate mixture of the said anhydrous fluoride with the said uranium hexafluoride, subsequently vaporising the uranium hexafluoride and thereby separating it from the potassium fluoride, and condensing the vapours of the uranium hexafluoride.

16. A process for treating uranium hexafluoride containing as impurity a small amount of hydrofluoric acid which comprises heating hydrated potassium fluoride to render it anhydrous, forming an intimate mixture of the said anhydrous fluoride with the said uranium hexafluoride, subsequently heating the said mixture so as to vaporise the uranium hexafluoride and thereby separate it from the potassium fluoride, and condensing the vapours of the uranium hexafluoride.

17. A process for treating uranium hexafluoride containing as impurity a small amount of hydrofluoric acid which comprises contacting the uranium hexafluoride with an anhydrous alkali metal fluoride by forming an intimate mixture of the said fluorides, subsequently heating the said mixture in vacuo so as to vaporise the uranium hexafluoride and thereby separate it from the alkali metal fluoride, and condensing the vapours of the uranium hexafluoride.

18. A process for treating uranium hexafluoride containing as impurity a small amount of hydrofluoric acid which comprises contacting the uranium hexafluoride with anhydrous potassium fluoride by forming an intimate mixture of the said fluorides, subsequently heating the said mixture in vacuo so as to vaporise the uranium hexafluoride and thereby separate it from the anhydrous potassium fluoride, and condensing the vapours of the uranium hexafluoride.

19. A process for treating uranium hexafluoride containing as impurity a small amount of hydrofluoric acid which comprises heating hydrated potassium fluoride to render it anhydrous, forming an intimate mixture of the said anhydrous fluoride with the said uranium hexafluoride, subsequently heating the said mixture in vacuo so as to vaporise the uranium hexafluoride and thereby separate it from the potassium fluoride, and condensing the vapours of the uranium hexafluoride.

References Cited in the file of this patent

UNITED STATES PATENTS

| | | |
|---|---|---|
| 2,058,075 | Gaither | Oct. 20, 1936 |
| 2,333,649 | Grosse | Nov. 9, 1943 |

OTHER REFERENCES

Mellor: "Comprehensive Treatise on Inorganic and Theoretical Chemistry," vol. II, 1922, page 512.

Mellor: "Comprehensive Treatise on Inorganic and Theoretical Chemistry," vol. XII, 1932, page 75.